US009697824B1

(12) United States Patent
Chen (10) Patent No.: US 9,697,824 B1
(45) Date of Patent: *Jul. 4, 2017

(54) VOICE CONTROL SYSTEM WITH DIALECT RECOGNITION

(71) Applicant: Thunder Power Hong Kong Ltd., Central (HK)

(72) Inventor: Yong-Syuan Chen, New Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,092

(22) Filed: Jul. 22, 2016

Related U.S. Application Data (63) Continuation of application No. 14/996,180, filed on Jan. 14, 2016, now Pat. No. 9,437,191.

(60) Provisional application No. 62/272,710, filed on Dec. 30, 2015.

(51) Int. Cl.
| | | |
|---|---|---|
| *G10L 15/22* | (2006.01) | |
| *G06F 17/28* | (2006.01) | |
| *G10L 15/00* | (2013.01) | |
| *G10L 15/10* | (2006.01) | |
| *B60R 16/037* | (2006.01) | |
| *G10L 15/07* | (2013.01) | |
| *G10L 17/22* | (2013.01) | |

(Continued)

(52) U.S. Cl.
CPC .......... *G10L 15/07* (2013.01); *B60R 16/0373* (2013.01); *G01C 21/3608* (2013.01); *G06F 3/04842* (2013.01); *G10L 17/22* (2013.01)

(58) Field of Classification Search
CPC ......... G06F 17/27; G06F 17/28; G10L 15/22; G10L 2015/223; G10L 15/26; G10L 15/265; G10L 15/28
See application file for complete search history.

(56) References Cited

U.S. PATENT DOCUMENTS

| | | | | |
|---|---|---|---|---|
| 6,085,160 A * | 7/2000 | D'hoore | .................. | G09B 19/06 704/2 |
| 6,556,972 B1 * | 4/2003 | Bakis | .................... | G06F 17/289 704/2 |

(Continued)

*Primary Examiner* — Eric Yen
(74) *Attorney, Agent, or Firm* — Kilpatrick Townsend & Stockton LLP (57) ABSTRACT

Voice command recognition with dialect translation is disclosed. User voice input can be translated to a standard voice pattern using a dialect translation unit. A control command can then be generated based on the translated user voice input. In certain embodiments, the voice command recognition system with dialect translation can be implemented in a driving apparatus. In those embodiments, various control commands to control the driving apparatus can be generated by a user with a dialect input. The generated voice control commands for the driving apparatus can include starting the driving apparatus, turning on/off A/C unit, controlling the A/C unit, turning on/off entertainment system, controlling the entertainment system, turning on/off certain safety features, turning on/off certain driving features, adjusting seat, adjusting steering wheel, taking a picture of surroundings and/or any other control commands that can control various functions of the driving apparatus.

18 Claims, 6 Drawing Sheets

(51) Int. Cl.
*G06F 3/0484* (2013.01)
*G01C 21/36* (2006.01)

(56) References Cited

U.S. PATENT DOCUMENTS

| | | | | |
|---|---|---|---|---|
| 7,471,102 B2* | 12/2008 | Maheshwari | G01R 31/2884 | |
| | | | | 324/762.09 |
| 8,380,504 B1* | 2/2013 | Peden | G10L 13/086 | |
| | | | | 704/200 |
| 9,437,191 B1 | 9/2016 | Chen | | |
| 2008/0059200 A1* | 3/2008 | Puli | G06F 17/289 | |
| | | | | 704/277 |
| 2008/0133245 A1* | 6/2008 | Proulx | G06F 17/2818 | |
| | | | | 704/277 |
| 2008/0228480 A1* | 9/2008 | Maegawa | G10L 15/07 | |
| | | | | 704/235 |
| 2008/0300855 A1* | 12/2008 | Alibaig | G10L 13/00 | |
| | | | | 704/3 |
| 2009/0070102 A1* | 3/2009 | Maegawa | G10L 15/183 | |
| | | | | 704/9 |
| 2009/0319267 A1* | 12/2009 | Kurki-Suonio | G10L 15/30 | |
| | | | | 704/235 |
| 2010/0324884 A1* | 12/2010 | Jeffrey | G06F 17/289 | |
| | | | | 704/2 |
| 2011/0125486 A1* | 5/2011 | Jaiswal | G06F 17/289 | |
| | | | | 704/3 |
| 2011/0238407 A1* | 9/2011 | Kent | G06F 17/289 | |
| | | | | 704/3 |
| 2012/0122577 A1* | 5/2012 | Aronzon | A63F 13/12 | |
| | | | | 463/36 |
| 2012/0265518 A1* | 10/2012 | Lauder | G06F 17/2854 | |
| | | | | 704/3 |
| 2013/0030789 A1* | 1/2013 | Dalce | G06F 17/289 | |
| | | | | 704/2 |
| 2015/0186357 A1* | 7/2015 | Oldham | G06F 9/4448 | |
| | | | | 704/8 |

* cited by examiner

VOICE CONTROL SYSTEM WITH DIALECT RECOGNITION

CROSS-REFERENCE TO RELATED APPLICATIONS

The present application is a continuation of Non-Provisional U.S. application Ser. No. 14/996,180, filed on Jan. 14, 2016, which claims priority to U.S. Provisional Patent Application No. 62/272,710, filed on Dec. 30, 2015, the disclosures of which are hereby incorporated by reference in their entirety for all purposes.

FIELD

The present disclosure generally relates to controlling a driving apparatus through voice commands.

BACKGROUND

Conventional speech recognition systems on board an automobile facilitate drivers and/or passengers to control various vehicle functions through voice commands. Typically, one or more microphones can be placed throughout the cabin of the automobile and coupled to a speech processor to process user voice commands using acoustic and language modeling techniques. Voice pattern data is typically stored in a memory in an on-board speech recognition system and is retrieved from the memory for recognizing user voice commands.

One problem associated with the conventional on-board speech recognition system is that it is limited in recognizing voice commands provided by user with a dialect. A dialect typically refers to a variety of a single language that is a characteristic of a particular group of the language's speakers. Different communities within the single language may have different ways of talking the same language that set them apart from others. Those differences may be thought of as dialects—not just accents (the way words are pronounced) but also grammar, vocabulary, syntax and common expressions. Often a group that is somewhat isolated regionally or socially from other groups will develop a characteristic dialect. For example, there are thousands of dialects in China such as Cantonese, Shanghainese, Sichuanese, Fujianese and on and on.

Users with different dialects present a challenge to conventional on-board speech recognition system in that the conventional on-board speech recognition system only maps a user input to a standard voice pattern. That is, the conventional on-board speech recognition system is not equipped to distinguish dialect differences and requires a user to input voice command through a standard language pattern. In the case of Chinese, the conventional on-board speech recognition system typically requires a user to input voice commands through Mandarin. If a user inputs a voice command through his/her dialect, the conventional on-board speech system would typically not respond correctly.

BRIEF SUMMARY

Embodiments can facilitate a user of a driving apparatus to provide a voice input with dialect. A dialect translation layer may be implemented to translate user voice input to a standard voice pattern and based on the translated voice pattern, a control command may be generated to control various functions of the driving apparatus and/or to maneuver the driving apparatus. Compared with the conventional on-board speech recognition system, the present disclosure enables the user to provide voice input using a dialect and thus provide the user convenience of operation of the driving apparatus. The present disclosure improves command recognition accuracy over the conventional on-board speech recognition system by accounting for dialect differences among users of the driving apparatus.

In some embodiments, a locale of the driving apparatus may be selected by a user. When a voice input is received from the user, a dialect translation unit corresponding to the selected locale can be loaded. The received user voice input can be processed through the dialect translation unit. The dialect translation unit can be configured to recognize dialect characteristics unique to a dialect associated with the dialect translation unit.

In some embodiments, after being processed through the dialect translation unit, the translated user input can be further processed through a voice pattern control command unit. The voice pattern control command unit can be configured to generate control command to control various functions of the driving apparatus such as, but not limited to, starting the driving apparatus, turning on/off A/C unit, controlling the A/C unit (e.g., adjust temperature and/or wind quality), turning on/off entertainment system, controlling the entertainment system, turning on/off certain safety features, turning on/off certain driving features, adjusting seat, adjusting steering wheel, taking a picture of surroundings and/or any other control commands that can control various functions of the driving apparatus. In some embodiments, the voice control command unit can be configured to generate control command to maneuver the driving apparatus. For example, the user can be enabled to provide a voice input with his/her own dialect to drive the driving the apparatus. For instance, the user can be enabled to instruct the driving apparatus to make a turn, to accelerate, to slow down, to stop, to go forward, to park itself and/or to maneuver any other ways.

In some examples, facilitating the user of a driving apparatus to provide a voice input with dialect may involve determining a locale of the user automatically. For example, a dialect associated with a user may be determined based on the location of the driving apparatus. In some examples, facilitating the user of a driving apparatus to provide a voice input with dialect may involve recognizing a voice of the user, identifying the user, and automatically determining a dialect associated with the user. In some examples, facilitating the user of a driving apparatus to provide a voice input with dialect may involve performing various dialect translation operations described herein at a server.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
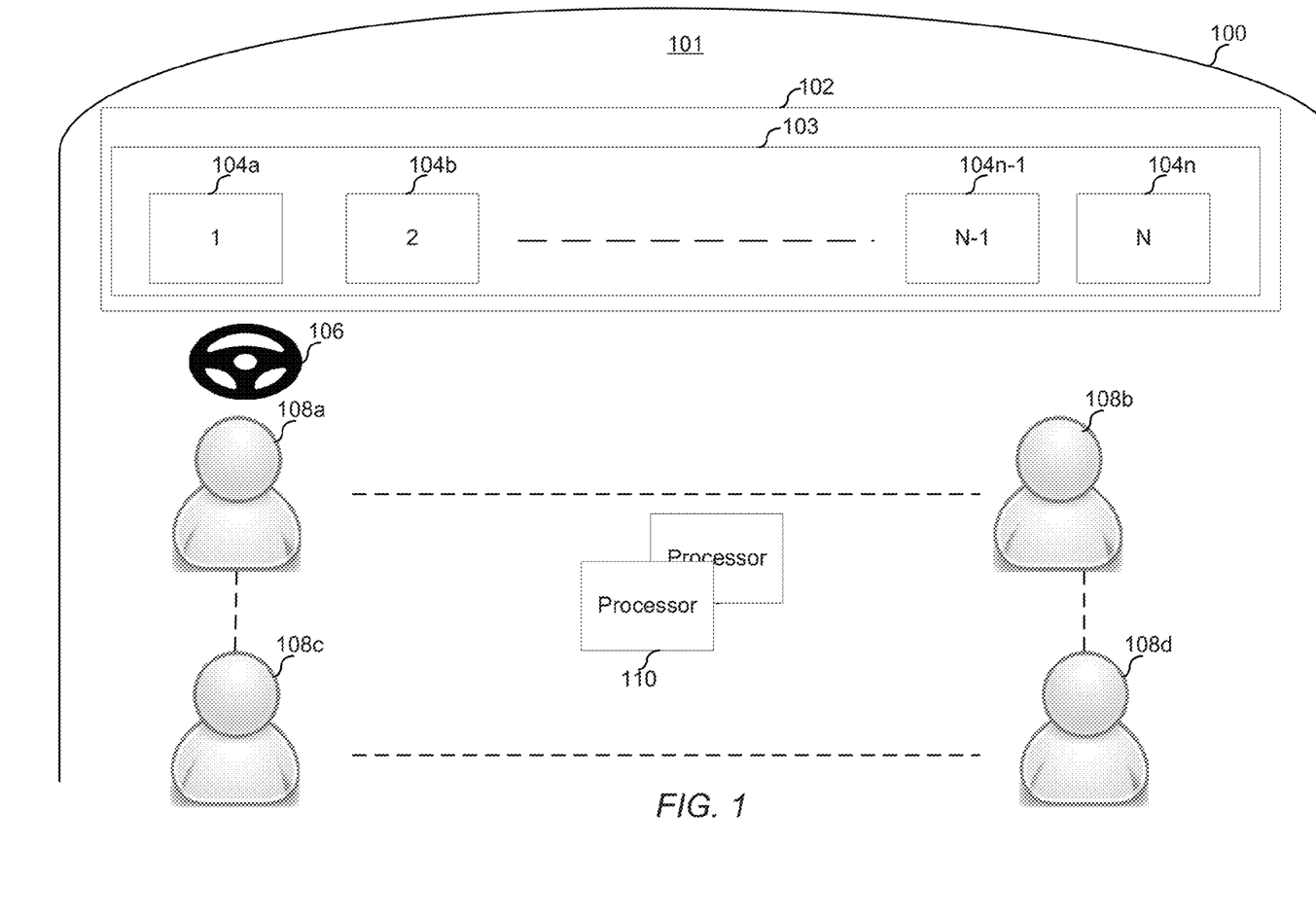
FIG. 1 generally illustrates an example of a driving apparatus in accordance with the disclosure.

FIG. 1 generally illustrates an example of a driving apparatus 100 in accordance with the disclosure. The driving apparatus 100 may include any apparatus that moves in distance. Examples of driving apparatus 100 may include a vehicle such as a car, a bus, a train, a truck, a tram, or any other type of vehicle; may include a vessel such as a boat, a ship, a barge, a ferry or any other type of watercraft; may include an aircraft such as an airplane, a spaceship, or any other type of aircraft; or may include any other transportation apparatus. In one example, the driving apparatus 100 is an electrical automobile. As shown, the driving apparatus 100 may include a cabin 101 with a volume.

As shown in FIG. 1, in the cabin 101, there may be a dashboard 102 that has a screen 103. Although in this example, a dashboard screen 103 occupies the entire surface of the dashboard 102, this is not intended to be limiting. It is contemplated that in some cases, the dashboard screen 103 may occupy a portion of the dashboard 102 instead of the entire dashboard 102. In any case, the dashboard screen 103 is suitable to display one or more information panels, such as the information panels 104 shown in FIG. 1. In implementations, the dashboard screen 103 may include any display technology, such as liquid-crystal display (LCD), crystal LCD, light-emitting diode (LED), organic light-emitting diode (OLED), active-matrix organic light-emitting diode (AMOLED), Plasma, projection panel, cathode ray tube (CRT), and/or any other display technology.

In some examples, information presented in the information panels 104 may include gauge information related to the transportation apparatus 100, such as current speed/altitude/direction/wind, current longitude/latitude, distance traveled, RPM, fuel level, battery level, and/or any other gauge information related to the transportation apparatus 100. In some examples, information presented in the information panels 104 may include indication information, such as seat belt, airbag, door, trunk, maintenance, safety, window lock, door lock indication information or any other indication information. In some examples, information presented in the information panels 104 may include navigational or GPS information related to navigation of the driving apparatus 100, such as current street traveled on, map of an area the transportation apparatus 100 is traveling in, the destination information, direction instructions, traffic condition, estimated arrival time, estimated delay due to traffic, and/or any other navigation information. In some examples, information presented in the information panels 104 may include cabin information, such as current temperature, humidity, wind speed, number of passengers in one or more zones in the cabin 101 and/or any other cabin information. In some examples, information presented in the information panels 104 may include configuration information regarding the transportation apparatus 100, such as seat configuration, mirror configuration, battery configuration, driving mode configuration, and/or any other configuration. In some examples, information presented in the information panels 104 may include entertainment information. For example, such an information panel may include a video screen capable of presenting a video or still images, a browser screen capable of presenting web information, a game screen capable of presenting one or more games for user interaction, a music information screen capable of enabling a user to consume music pieces, e-commerce information screen capable of enabling a user to engage remote transaction via the Internet, radio information screen capable of presenting a list of radio stations available for user consumption, and/or any other type of infotainment screen. In some examples, information presented in the information panels 104 may include notification information such as incoming call, incoming text message, incoming video chat request, and/or any other notification information. Other examples of information panels 104 are contemplated.

As still shown in FIG. 1, the driving apparatus 100 may comprise one or more steering wheels 106 in the cabin 101. Although only one steering wheel 106 is shown in FIG. 1, this is not intended to be limiting. In some examples, the driving apparatus 100 may include more than one steering wheel 106. For example, it is contemplated that the driving apparatus 100 may be an aircraft that comprises at least a main steering wheel 106 for the main pilot and at least a secondary steering wheel 106 for a co-polit.

As also shown in FIG. 1, one or more users 108 may be arranged to occupy their corresponding positions in the cabin 101. The users 108 may include one or more drivers that control the movement or navigation of the driving apparatus 100, one or more passengers, and/or any other type of users 108. In this example, the user 108a is a driver that controls the driving of the driving apparatus 100, while other users 108, e.g., users 108b-d, are passengers. As still shown, there may be multiple rows of users 108 within the cabin 101 of the transportation apparatus 100.

As still shown in FIG. 1, driving apparatus 100 may include one or more processors 110 configured to control one or more electrical system or subsystems in driving apparatus 100. Types of processor 110 may include generic processor configured to execute machine-readable instructions, and/or specialized processors such as Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), speech recognition IC, and/or any other specialized processors.

Figure 2:
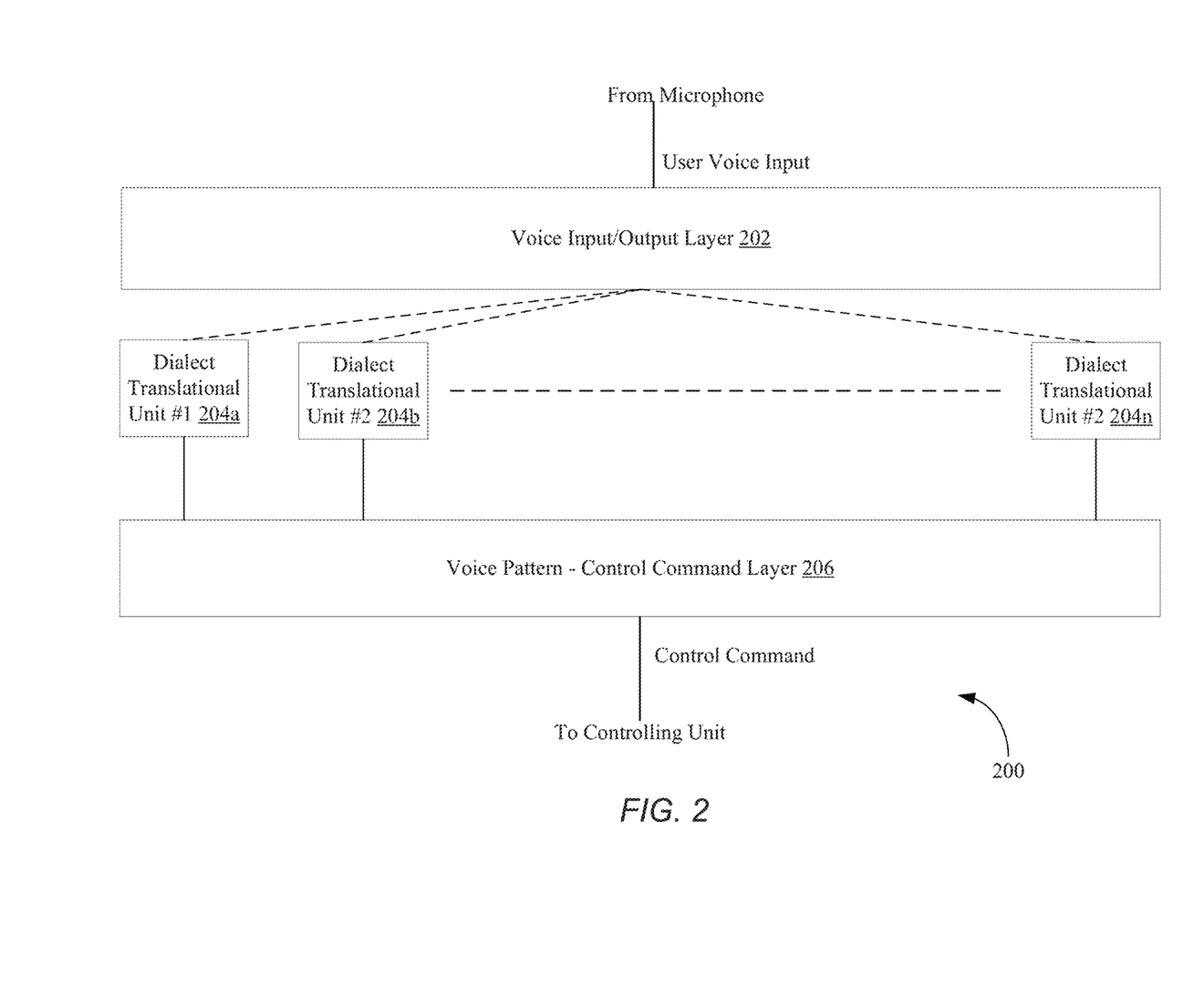
FIG. 2 illustrates an exemplary implementation for facilitating a user of a driving apparatus to provide a voice input with dialect.

With an example of driving apparatus 100 in accordance with the disclosure having been generally described, attention is now directed to FIG. 2. FIG. 2 illustrates an exemplary implementation 200 for facilitating a user of driving apparatus 100 to provide a voice input with dialect. It will be described with reference to FIG. 1. In some embodiments, implementation 200 may be realized through one or more processors 110 shown in FIG. 3. In some embodiments, implementation may be realized through a client/server architecture shown in FIG. 4. For facilitating a user of a driving apparatus 100 to provide a voice input with dialect, implementation 200 can include a voice input/output layer 202. As shown, the voice input/output layer 202 can be configured to receive user voice input provided through a microphone. The microphone can be positioned, for example, on the dashboard 102, on an overhead console or in a rear view mirror in the driving apparatus 100. In one embodiment, the microphone employs dynamic and electronic adaptive beam forming technology. The microphone can receive an audio signal command from any one or ones of users 108.

The voice input/output layer 202 can be configured to convert the analog signal representing the user voice input from the microphone to an digital signal. The conversion can involve quantization of the user voice input to correct error. The result of the conversion can be a sequence of digital values that have been converted from a continuous-time and continuous-amplitude analog signal to a discrete-time and discrete-amplitude digital signal. In some embodiments, the voice input/output layer 202 can be configured to perform noise cancellation and echo cancellation.

The voice input/output layer 202 can be configured to convert the digital signal to voice pattern represents characteristics of the user voice input. In one embodiment, the voice pattern is in the form of N number vector fi (i=1, 2, - - - , N), each component, for example, being a frequency spectrum component of the input voice. Key to this disclosure is that the voice input/output layer 202 can selectively load a dialect translation unit 204. The dialect translation unit can be configured to process the voice pattern converted from the digital signal, also referred to as input pattern herein, and convert the input pattern (with dialect) to a standard voice pattern (without dialect). A dialect translation unit 204, such as 204a, 204b or 204n, can include reference patterns, represented corresponding vectors. The reference patterns can be stored in a dictionary memory and can be pre-configured from voice inputs provided at a configuration stage of implementation 200. For example, dialect translation unit 204a can include reference patterns representing Shanghainese (a dialect spoken in Shanghai region of China). Each of the reference patterns may be generated from a user voice input provided through Shanghai dialect. The reference pattern may indicate a control instruction from the user, such as turn on A/C, pick up a call, turn off entertainment system, just to name few.

In implementations, the reference patterns included in a single dialect translation unit 204 (e.g., Shanghainese) can be arranged into different categories. A single reference pattern corresponding to each designated category represents, for example, a certain character or voice pattern to be identified. That is, one category can consist of a word (typically a verb) in that dialect, another category can consist of another word (e.g., another verb) in that dialect. The separate categories of reference patterns can consist of the respective sounds and syntax for pronouncing a corresponding instruction. During runtime, these reference patterns can be compared with the vector representations of the patterns to be processed (i.e., input patterns with dialect) to determine a numerical value of similarity. A high value of similarity can indicate that the input pattern is identical or nearly identical to the reference pattern.

In one embodiment, the individual dialect translation unit 204 can be configured to perform the following: first, signals representing the input pattern are sampled and these discrete sampled values are stored as vector components of the input signal. This input vector is then compared with the reference pattern vectors representing each category. A numerical value of similarity is then calculated for each category which indicates the degree of similarity between the input pattern and the reference pattern for each category. Second, the maximum value of similarity is determined from all the calculated values; this value thus identifies the category to which the input patterns belong. Based on the maximum value of similarity, a reference pattern can then be identified to be the best match to the input pattern with dialect. Each reference pattern included in the dialect translation unit 204 can be associated with a corresponding standard voice pattern (without dialect). In this way, the voice input with dialect can be processed and converted to a corresponding standard voice input.

The voice pattern and control command layer 206 can be configured to generate control command based on the standard voice pattern (without dialect) generated by the voice input/output layer 202. In implementations, the voice pattern and control command layer 206 can be configured to determine a control command based on the standard voice pattern (without dialect) using a similarity method described above. That is, the input vector of the standard voice pattern can be compared with reference pattern vectors representing control commands. A numerical value of similarity can be calculated for each reference pattern representing a control command; and the maximum value of similarity is determined from all the calculated values; this value can be used to identify a control command the stand voice pattern matches.

Figure 3:
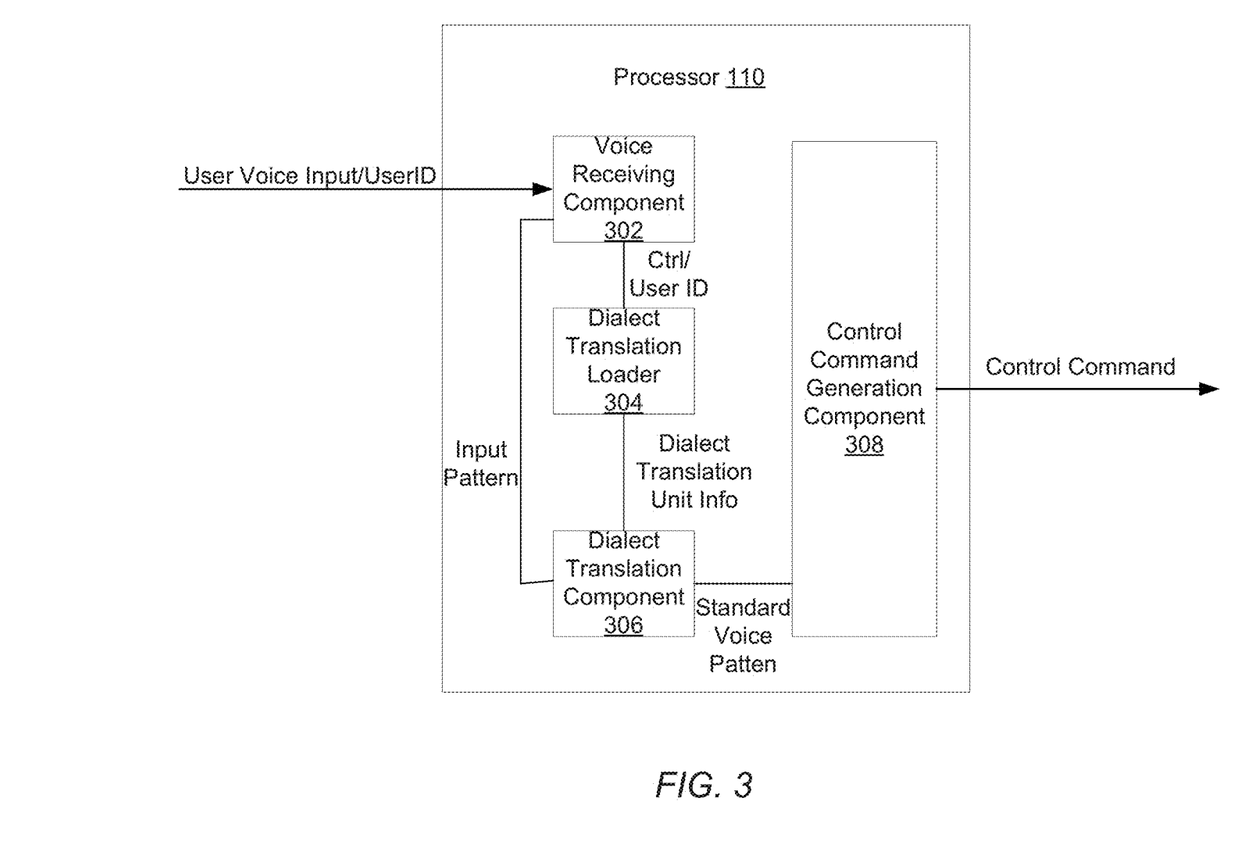
FIG. 3 illustrates an example of a voice control system with dialect processing capability in accordance with the disclosure.

FIG. 3 illustrates an example of a voice control system with dialect processing capability in accordance with the disclosure. As shown, the voice control system can be implemented using a processor 110 shown in FIG. 1. As also shown, the voice control system can include a voice receiving component 302, a dialect translation loader 304, a dialect translation component 306, a control command generation component 308, and/or any other components. The voice receiving component 302 can be configured to receive user voice inputs provided through a microphone. After receiving the user voice inputs, the voice receiving component 302 can be configured to convert the analog signal representing the user voice input from the microphone to an digital signal. The analog to digital conversion by the voice receiving component 302 can involve quantization of the user voice input to correct error. The result of the analog to digital conversion can be a sequence of digital values that have been converted from a continuous-time and continuous-amplitude analog signal to a discrete-time and discrete-amplitude digital signal. The voice receiving component 302 can be configured to convert the digital signal to input pattern represents characteristics of the received user voice input. In one embodiment, the voice pattern is in the form of N number vector fi (i=1, 2, - - - , N), each component, for example, being a frequency spectrum component of the input voice.

In some examples, the voice receiving component 302 can be configured to identify a particular user based on the voice input received by the voice receiving component 302. For example, the voice receiving component 302 may be configured to challenge a user to provide a user name and password. Based on the user provided credentials, the voice receiving component 302 may identify the user. As another example, the voice receiving component 302 may be configured to recognize a characteristic of characteristics in the user voice inputs received and to match the recognized characteristic(s) to a user ID known to have the recognized characteristic(s) in his/her voice.

In some embodiments, an association between a particular user and a dialect of the user can be automatically determined by the voice receiving component 302 based on a locale of the user. For example, the locale of the user may be determined based on the location of the driving apparatus 100. As illustration, when the user is providing voice input at a location (e.g., Shanghai), the user may be associated with a dialect used at that location. In some embodiments, the voice receiving component 302 can be configured to analyze voice input from the user and automatically determine a dialect in the voice input. However, these are necessarily the only cases, as will be illustrated in FIGS. 5A-B, the user can be enabled to select a dialect to be associated with him or her.

Figure 5A:
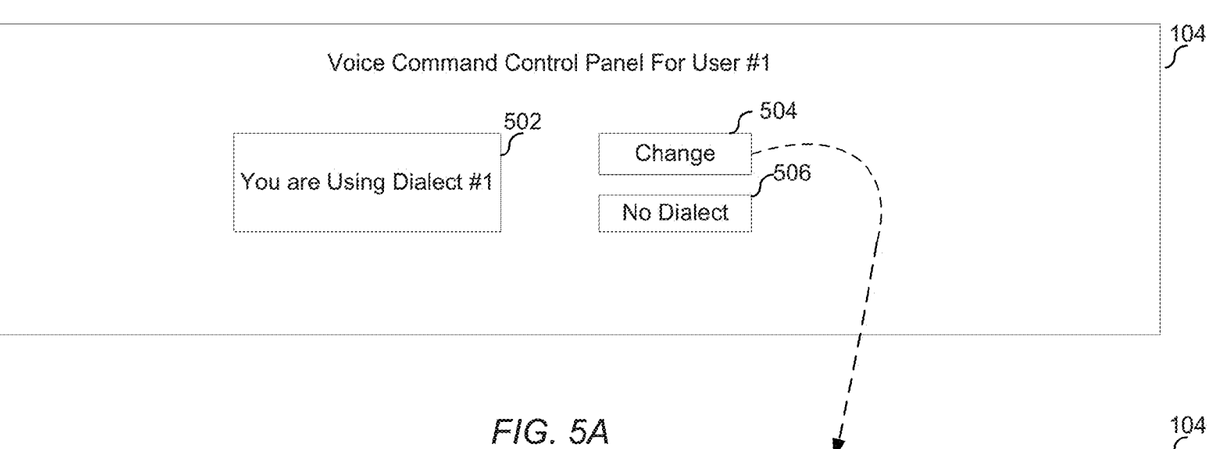
FIG. 5A illustrates an exemplary user interface for configuring a dialect to be associated with a user.
Figure 5B:
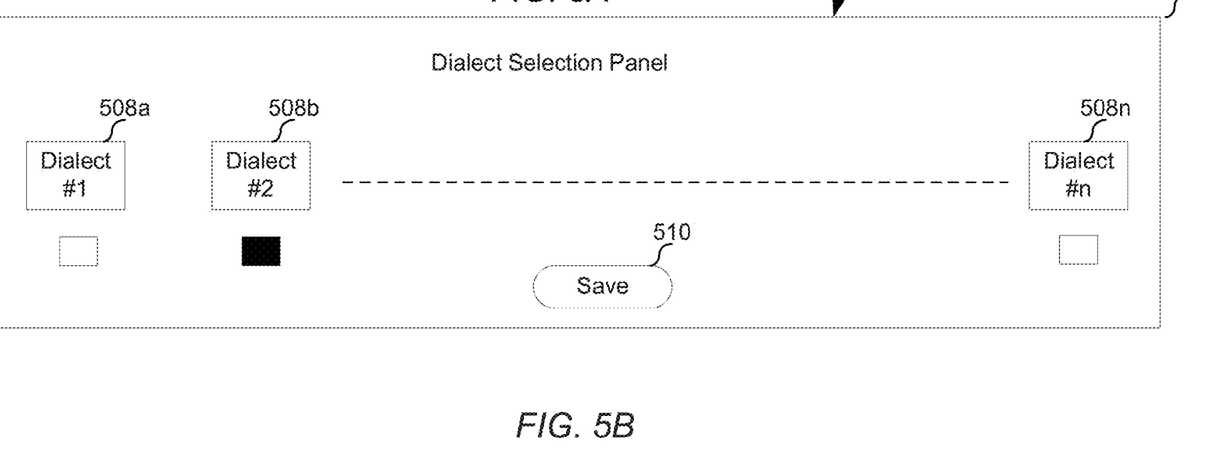
FIG. 5B illustrates an exemplary user interface for selecting a dialect to be associated with a user.

The dialect translation loader 304 may be configured to determine an appropriate dialect translation unit to be loaded based on the user ID provided by the voice receiving component 302. In implementations, an individual user can be associated with a corresponding dialect. Exemplary mechanism for achieving this association is illustrated in FIGS. 5A-5B. For example, based on the user ID provided by the voice receiving component 302, mappings of user dialect associations can be consulted and appropriate dialect translation unit can be loaded into memory by the dialect translation loader 304. It should be appreciated that the loading of the dialect translation unit can be dynamically done by the dialect translation loader 304 at a runtime. That is, the dialect translation loader 304 can be configured to load appropriate dialect translation unit after the user ID is provided by the voice receiving component 302.

The dialect translation component 306 can be configured to process the input voice pattern (with dialect) provided by the voice receiving component 302 by executing the dialect translation unit loaded by the dialect translation loader 304. In implementations, the dialect translation component 306 can be configured to receive memory location information where the dialect translation loader 304 the dialect translation unit into. However, this is not necessarily the only case. In some other implementations, the dialect translation loader 304 may be configured to always load a dialect translation unit into a predetermined range of memory locations and the dialect translation component 306 can be configured to invoke the dialect translation unit loaded into the predetermined range of memory locations.

Executing the dialect translation unit by the dialect translation component 306 can involve comparing vectors representing the input voice pattern provided by the voice receiving component 302 with reference pattern vectors included in the dialect translation unit loaded by the dialect translation loader 304. A numerical value of similarity can be calculated by the dialect translation component 306 for each reference pattern which indicates the degree of similarity between the input pattern and the reference pattern. Dialect translation component 306 can be configured to determine the maximum value of similarity from all the calculated values. Based on the maximum value of similarity, a reference pattern can then be identified by the dialect translation component 306 to be the best match to the input pattern. Based on the reference pattern identified as the best match to the input pattern, a standard voice pattern corresponding to the identified reference pattern can be determined by the dialect translation component 306.

The control command generation component 308 can be configured to generate control commands based on the standard voice pattern provided by the dialect translation component 306. In implementations, the control command generation component 308 can be configured to determine a control command based on the standard voice pattern (without dialect) similar to the determination of matching reference pattern to input pattern by the dialect translation component 306. That is, the control command generation component 308 can be configured to compare the input vector of the standard voice pattern with reference pattern vectors representing control commands. A numerical value of similarity can be calculated for each reference pattern representing a control command; and the maximum value of similarity is determined from all the calculated values; this value can be used to identify a control command the stand voice pattern matches. The control commands generated by the control command generation component 308 may include commands to control various functions of the driving apparatus such as, but not limited to, starting the car, turning on/off A/C unit, controlling the A/C unit (e.g., adjust temperature and/or wind quality), turning on/off entertainment system, controlling the entertainment system, turning on/off certain safety features, turning on/off certain driving features, adjusting seat, adjusting steering wheel, taking a picture of surroundings and/or any other control commands that can control various functions of the driving apparatus 100. In some examples, the control commands generated by the control command generation component 308 may include commands to maneuver the driving apparatus 100. For example, the control commands generated by control command generation component 308 may be executed by processor 110 to instruct the driving apparatus 100 to make a turn, to accelerate, to slow down, to stop, to go forward, to park itself and/or to maneuver any other ways.

Figure 4:
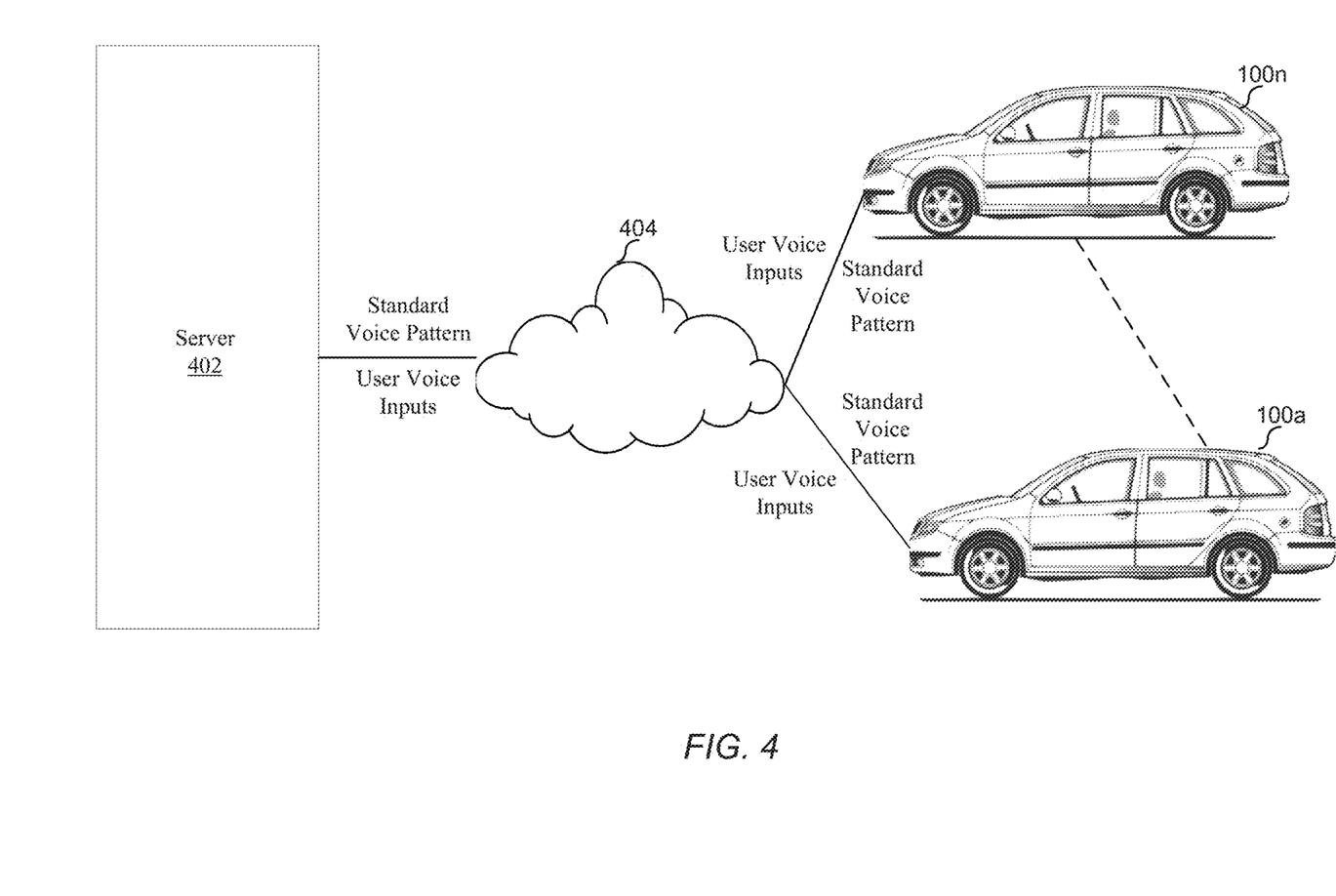
FIG. 4 illustrates a general client/server architecture for facilitating a user of a driving apparatus to provide a voice input with dialect in accordance with the disclosure.

FIG. 4 illustrates a general client/server architecture for facilitating a user of a driving apparatus to provide a voice input with dialect in accordance with the disclosure. In some embodiments, as the case shown in FIG. 4, facilitating a user to provide a voice input with dialect in accordance with the disclosure may involve a server 402. As shown, driving apparatus 100, such as 100a and 100n, can transmit user voice inputs (with dialect) via a network 404. The network 404 can be a wireless, a wired network, or a combination of both (i.e., a portion of the network 404 is wireless and a portion of the network 404 is wired). The server 402 can be configured to process the user voice inputs received from driving apparatus 100. In implementations, the server 402 can be configured to perform functions attributed to component dialect translation loader 304 and dialect translation component 306 described herein. As shown, server 402 may provide standard voice pattern (without dialect) back to driving apparatus 100. The standard voice pattern provided by server 402 can then be used by driving apparatus 100 to generate control commands. The advantage of the example shown in FIG. 4 is that it does not require significant change to existing speech control systems already installed in driving apparatus 100. The dialect translation of user voice input in this example is processed by server 402, which is flexible extension to the speech control system already installed in driving apparatus 100.

FIGS. 5A-B illustrate exemplary user interfaces facilitating a user to select a dialect to be associated with the user. It will be described with reference to FIG. 1. As shown, in the information panel 104 shown in FIG. 1, a voice command control panel for a particular user may be displayed. For example, the voice command control panel may be called up by a user manually by providing a user ID associated with the user, or may be presented upon the user activates a user voice control system within the driving apparatus 100. As shown, the voice command control panel may present information 502 indicating that the user is using (associated with) a particular dialect. As shown, the control button 504 may be presented in the voice command control panel to enable the user to change the dialect that is currently associated with the user as indicated by information 502. As also shown, a control button 506 can be presented in the voice command control panel to enable the user to instruct the system not to use any dialect to process his/her voice input—i.e., to override the dialect processing function described herein. As still shown, after the user click on or tap button 504, a dialect selection panel may be presented in the information panel 104. The dialect selection panel may present the user a number of dialects available in the system for processing, such as 508a, 508b, 508n shown in FIG. 5. As shown, the user can select a desired dialect to be associated with the user for processing his/her voice input. In this example, the user selects dialect 508b. As also shown, the user can be enabled to save the dialect selection through button 510.

Figure 6:
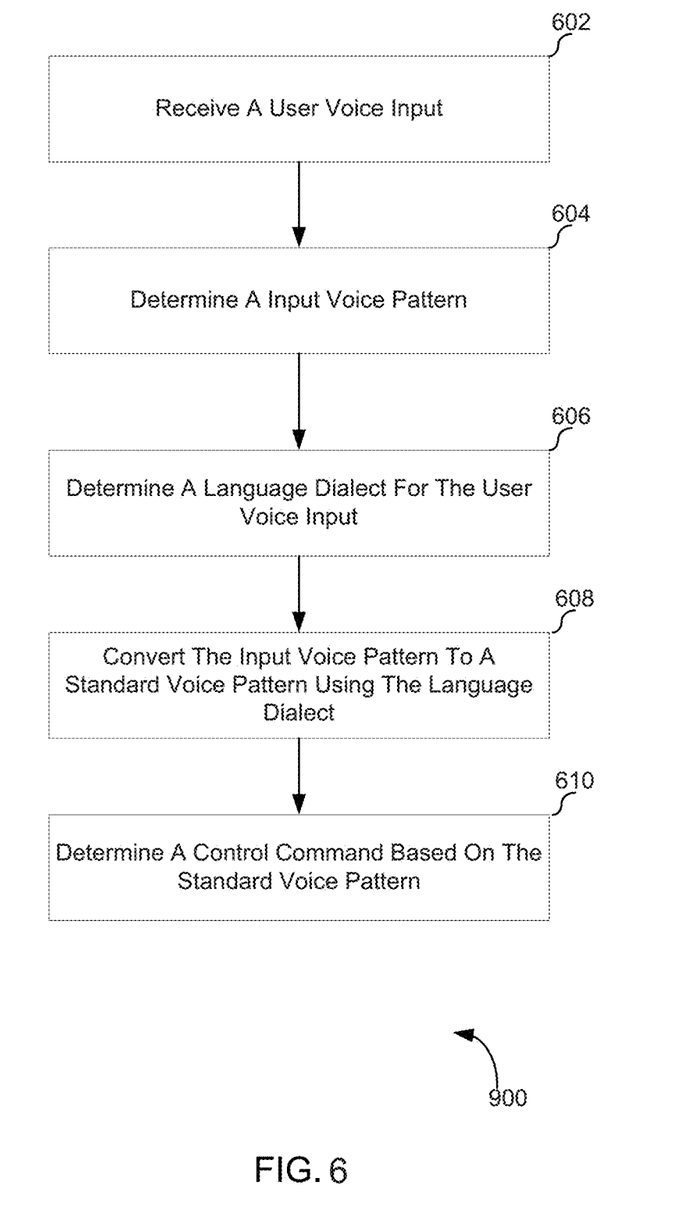
FIG. 6 illustrates an example of a process for facilitating a user of a driving apparatus to provide a voice input with dialect.

FIG. 6 illustrates an example of a process 600 for facilitating a user of a driving apparatus to provide a voice input with dialect. Process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 can be performed under the control of one or more computer systems configured with executable instructions and can be implemented as code (e.g., executable instructions, one or more computer programs, or one or more applications) executing collectively on one or more processors, by hardware, or combinations thereof. The code can be stored on a computer-readable storage medium, for example, in the form of a computer program comprising a plurality of instructions executable by one or more processors. The computer-readable storage medium can be non-transitory.

In some aspects, the process 600 can be performed by one or more of a server, such as server 402 described and illustrated herein.

At 602, a user voice input can be received. In some examples, 602 can be performed by voice receiving component the same as or substantially similar to the voice receiving component 302 described and illustrated herein.

At 604, a voice input pattern can be determined based on the voice input received at 602. In some examples, 604 can be performed by a voice receiving component the same as or substantially similar to voice receiving component 302 described and illustrated herein.

At 606, a language dialect can be determined for the voice input received at 602. In some examples, 606 can be performed by dialect translation loader the same as or substantially similar to the dialect translation loader 304 described and illustrated herein.

At 608, the input voice pattern determined at 604 can be converted to a standard voice pattern using the language dialect determined at 606. In some examples, 608 can be performed by dialect translation component the same as or substantially similar to dialect translation component 306 described and illustrated herein.

At 610, a control command can be determined based on the standard voice pattern obtained at 608. In some examples, 610 can be performed by performed by control command generation component the same as or substantially similar to the control command generation component 308 described and illustrated herein The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-7 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method for facilitating a user to control a driving apparatus through a voice command, the method comprising:
   receiving, by a processor, a user voice input;
   determining, by the processor, a language dialect the user voice input is associated with a language dialect;
   translating, by the processor, the voice input to a standard voice pattern based on the language dialect associated with the user voice input;
   based on the standard voice pattern, determining, by the processor, a control command corresponding to the user voice input for maneuvering the driving apparatus; and
   effectuating, by the processor, execution of the control command to control the driving apparatus.

2. The computer-implemented method of claim 1, wherein the user voice input includes information indicating a translational and/or a rotational maneuver of the driving apparatus.

3. The computer-implemented method of claim 1, wherein the user voice input includes information indicating a control of a component within the driving apparatus.

4. The computer-implemented method of claim 1, further comprising storing preset characteristics of the language dialect, and wherein determining the language dialect the user voice input is associated with comprises determining dialect characteristics of the voice input and comparing the dialect characteristics of the voice input with the preset characteristics of the language dialect.

5. The computer-implemented method of claim 1, wherein determining the user voice input is associated with the language dialect includes:
   retrieving one or more reference patterns representing predetermined voice inputs in the language dialect;
   obtaining characteristic vectors for the reference patterns;
   obtaining a characteristic vector for the user voice input;
   for each characteristic vector for the reference patterns, determining a similarity between the characteristic vector for the reference pattern and the characteristic vector for the user voice input; and
   determining the reference pattern having a highest similarity to the user voice input as the matching reference pattern.

6. The computer-implemented method of claim 1, further comprising automatically determining a user identification based on the user voice input received.

7. The computer-implemented method of claim 1, further comprising converting the user voice input to a sequence of digital values representing a vector indicating characteristics of the voice input and wherein the determining the user voice input is associated with a language dialect is based on the vector.

8. The computer-implemented method of claim 1, further comprising presenting a user interface enabling the user to select a locale to be associated with the user.

9. The computer-implemented method of claim 1, further comprising automatically loading a dialect translation unit into memory for processing the user voice input based on the determined language dialect.

10. A system for facilitating a user to control a driving apparatus through a voice command, the system comprising one or more processors configured by machine-readable instructions to perform:

receiving a user voice input;
determining the user voice input is associated with a language dialect;
translating the voice input to a standard voice pattern based on the language dialect associated with the user voice input;
based on the standard voice pattern, determining a control command corresponding to the user voice input for maneuvering the driving apparatus; and
effectuating execution of the control command to control the driving apparatus.

11. The system of claim 10, wherein the user voice input includes information indicating a translational and/or a rotational maneuver of the driving apparatus.

12. The system of claim 10, wherein the user voice input includes information indicating a control of a component within the driving apparatus.

13. The system of claim 10, wherein the processors are further configured to perform storing preset characteristics of the language dialect, and wherein determining the language dialect the user voice input is associated with comprises extracting dialect characteristics from the voice input and comparing the extracted dialect characteristics with the preset characteristics of the language dialect.

14. The system of claim 10, wherein determining the user voice input is associated with the dialect includes:
retrieving one or more reference patterns representing predetermined voice inputs in the language dialect;
obtaining characteristic vectors for the reference patterns;
obtaining a characteristic vector for the user voice input;
for each characteristic vector for the reference patterns,
determining a similarity between the characteristic vector for the reference pattern and the characteristic vector for the user voice input; and
determining the reference pattern having a highest similarity to the user voice input as the matching reference pattern.

15. The system of claim 10, wherein the processors are further configured to perform automatically determining a user identification based on the user voice input received.

16. The system of claim 10, wherein the processors are further configured to convert the user voice input to a sequence of digital values representing a vector indicating characteristics of the voice input and wherein the determining the user voice input is associated with a language dialect is based on the vector.

17. The system of claim 10, wherein the processors are further configured to present a user interface enabling the user to select a language to be associated with the user.

18. The system of claim 10, the processors are further configured to automatically load a dialect translation unit into memory for processing the user voice input based on the determined language dialect.

* * * * *